No. 810,183. PATENTED JAN. 16, 1906.
A. H. BLISS.
BRACELET.
APPLICATION FILED SEPT. 13, 1905.

Witnesses
F. N. Houston
Wm. B. Poor

Inventor
Anthony Hoxton Bliss
by Ellis Spear Jr
Attorney

UNITED STATES PATENT OFFICE.

ANTHONY HORTON BLISS, OF NORTH ATTLEBORO, MASSACHUSETTS.

BRACELET.

No. 810,183.      Specification of Letters Patent.      Patented Jan. 16, 1906.

Application filed September 13, 1905. Serial No. 278,226.

*To all whom it may concern:*

Be it known that I, ANTHONY HORTON BLISS, a citizen of the United States, residing at North Attleboro, in the county of Bristol and State of Massachusetts, have invented certain new and useful Improvements in Bracelets, of which the following is a specification.

This invention relates to bracelets, and has for its object certain improvements in the joining of the parts of such an article.

The couplings of this bracelet are devised so as to allow it to open with the ordinary swinging motion of the hinge-bracelet and also to permit it to expand to increase its circumference independently of its hinge action, as will be more fully described in the specification which follows.

Figure 1:
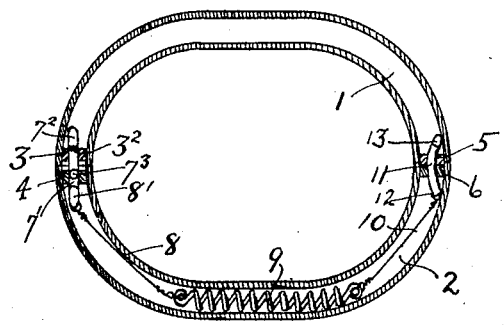
Figure 2:
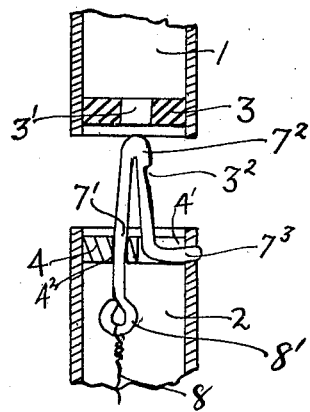
Figure 3:
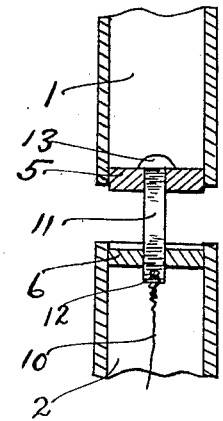

In the drawings, in which like numerals of reference indicate corresponding parts throughout, Figure 1 is a section of the bracelet closed; Fig. 2, a sectional view of the end, showing the catch; Fig. 3, a view of a section of the hinge end expanded, and Fig. 4 a section of the last-named end swung open.

1 and 2 are sections of a tubular bracelet, each section having at its ends disks 3, 4, 5, and 6, which are perforated at $3'$, $4'$, $5'$, and $6'$ and soldered within the said tubular sections. The slot $4'$ is extended laterally from near the center of the disk 4, and adjacent to its inner end is a hole $4^2$, into which is soldered the stem $7'$ of the fastening 7. This stem $7'$ is returned at $7^2$ to form a yielding arm for the catch, and this arm $7^2$ is notched at $3^2$ to engage with the edge of the perforation $3'$ of the disk 3. $7^3$ is a lateral extension of the arm $7^2$, which lies in the slot $4'$ and acts as a release for the arm $7^2$. The end of this extension $7^2$ appears at the surface of the bracelet, so that it can be pushed to release the catch. 8 is a wire connecting the hook $8'$, formed on the other end of the stem $7'$ with the coiled spring 9, which is connected by a similar wire 10 to one end of the link 11. This link 11 is a flattened bar having a perforation 12 at one end to receive the end of the wire 10 and a head 13 at the other end to prevent its withdrawal through the disk 5. It is therefore slightly larger than the opening $5'$. The link 11 is curved outward in the opposite direction to the other members 1 and 2 of the bracelet, so as to allow the disks to swing apart when the bracelet is opened outward on it (the link 11) as a hinge. It is also sufficiently long to allow the said members 1 and 2 to separate to increase the circumference of the bracelet.

The spring 9 tends to keep the bracelet closed both in its hinge motion and in its circumferential enlargement.

Figure 4:
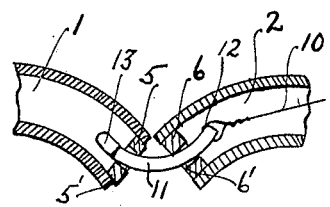

The operation of the parts is as follows, the bracelet being in the closed position indicated in Fig. 1. If pressure is applied to the exposed end of the bar $7^3$, the arm $7^2$ is pushed back toward the stem $7'$, by which movement the notch $3^2$ is released from the edge of the disk 3. The bracelet may now be swung open on 11 as a hinge, the disks 5 and 6 sliding out on the curve of the link, as shown in Fig. 4. This movement is, however, against the tension of the spring 9, which tends to throw the parts back into the closed position. In case only a very slight enlargement of the bracelet is needed, as is the case where the wearer has a small or flexible hand, the catch need not be released, but the members merely spread, as indicated in Fig. 3.

What I therefore claim, and desire to secure by Letters Patent, is—

1. In a device of the class described, the combination of a pair of curved members and a link slidably connecting adjacent ends thereof, said link being curved in an opposite direction to said members.

2. In a device of the class described, the combination of a pair of curved members and an oppositely-curved link located in and slidably connecting adjacent ends thereof, and yielding means for holding one end of said link in one of said ends.

3. In a device of the class described, the combination of a pair of curved tubular members, disks located in adjacent ends of said members, a slot in each of said disks, a link passing through the slot in each disk, and yielding means for holding one end of said link in one of said members.

4. In a device of the class described, the combination of a pair of members having perforated end disks, a link passing through said perforations and terminating at one end within one member in a head, and yielding means in the other of said members for holding the other end of said link.

5. In a device of the class described, the combination of a pair of adjacent ends, a disk having a perforation located in each of said ends, a fastening passing through one of said perforations and forming a spring-catch at its outer end, and a hook at its inner end, substantially as and for the purpose specified.

6. In a device of the class described, the combination of a pair of members, one of said members being tubular, a link located in and slidably connecting one pair of adjacent ends, a fastening for the other pair of adjacent ends and located in the said tubular member, said fastening forming a catch on its external end, and a hook on its internal end, and a spring fastened at one end to said hook and at the other end to the end of the said link located in said tubular member, substantially as and for the purpose specified.

In testimony whereof I affix my signature in presence of two witnesses.

ANTHONY HORTON BLISS.

Witnesses.
FRED. B. BYRAM,
F. H. BLISS.